United States Patent [19]

Andersson

[11] Patent Number: 4,677,733
[45] Date of Patent: Jul. 7, 1987

[54] DEVICE IN WOODWORKING MACHINES

[75] Inventor: Bengt A. Andersson, Halmstad, Sweden

[73] Assignee: Waco Jonsereds AB, Sweden

[21] Appl. No.: 860,865

[22] Filed: May 8, 1986

[30] Foreign Application Priority Data

May 13, 1985 [SE] Sweden .................................. 8502362

[51] Int. Cl.$^4$ ............................................. B23Q 39/04
[52] U.S. Cl. ...................................... 29/563; 29/33 P; 144/1 R; 144/3 R; 144/3 E
[58] Field of Search ................ 29/33 P, 563; 144/1 R, 144/3 R, 3 E

[56] References Cited

U.S. PATENT DOCUMENTS

| | | | |
|---|---|---|---|
| 3,530,571 | 9/1970 | Perry | 29/563 |
| 3,543,392 | 12/1970 | Perry et al. | 29/563 |
| 3,781,974 | 1/1974 | Hozl et al. | 29/563 |
| 3,946,484 | 3/1976 | Aronstein et al. | 29/563 |

Primary Examiner—W. D. Bray
Attorney, Agent, or Firm—Bacon & Thomas

[57] ABSTRACT

A device for a woodworking machine (13) adapted at a number of consecutive working stations (14) for processing workpieces which are fed through the machine. The required working of the workpieces can be effected with at least one working station out of operation. The working stations are separated from each other by partitions (20) which extend between external walls (11), a roof (12) and a base and which are closely associated with the machine on either side of the working stations (14) and, like the external walls and the roof, are soundproof. The tool or tools at each working station can be driven independently of the tools at the other working stations, and each compartment (22) defined by the partitions has a door (21) in the external wall (11). The path of travel of the workpieces through the machine is laterally limited by vertical walls and at the working stations the walls can be provided with covers for forming tunnel portions at these locations. A device is provided for indicating the state of operation in each compartment (22) and preventing unintentional activation of tools which are out of operation, such that a tool can be safely exchanged at one working station while workpieces are being processed at the other working stations.

3 Claims, 3 Drawing Figures

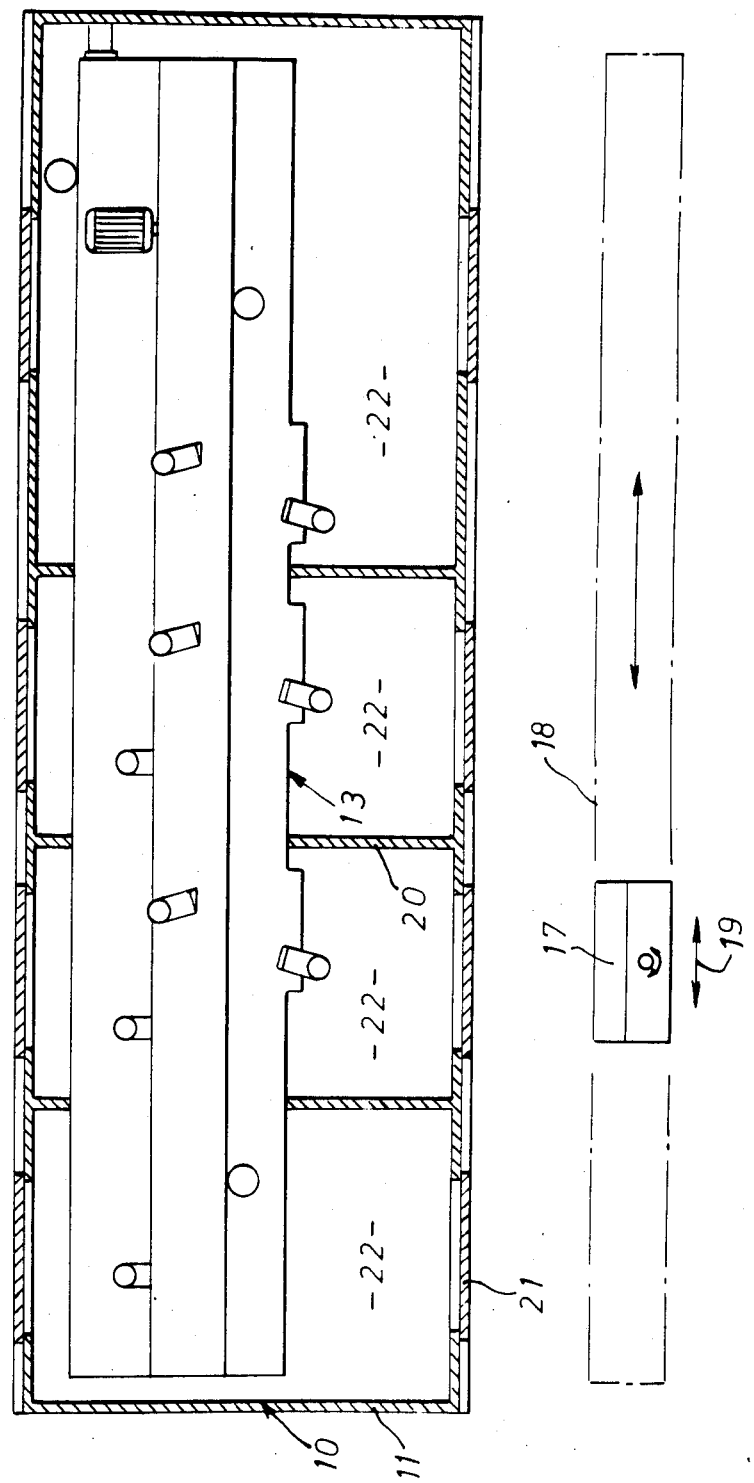

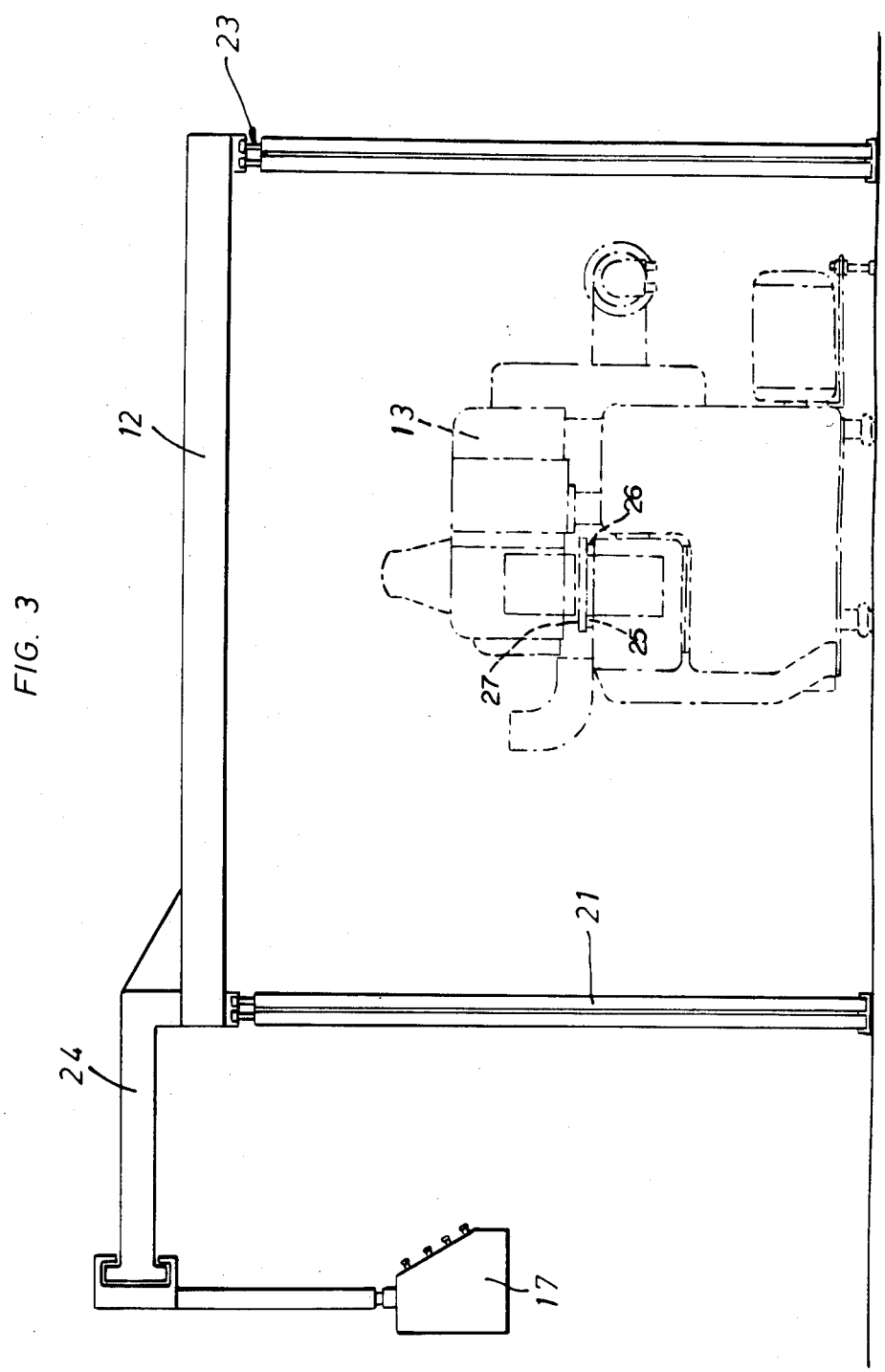

DEVICE IN WOODWORKING MACHINES

The present invention relates to a device in woodworking machines which is adapted to perform consecutive working operations on workpieces fed through the machine, and which is enclosed in a preferably sound-proof casing having external walls and a roof, the machine having so many working stations that the required working of the workpieces can be effected with at least one working station out of operation, the working stations being preferably doubled for each working operation.

Present-day woodworking machines which are capable of performing a plurality of consecutive working operations, such as milling of fillets, involve a substantial capital investment and, therefore, the machine must be in operation for a maximal part of each working period. In long production runs, this is no problem but the current tendency towards shorter runs markedly increases the down-time of the machine because of the tool changes required. Normally, every change of tools means a down-time of 20-30 minutes and since, in the above-mentioned short production runs, it is not unusual to have to carry out 4-8 tool changing operations every day, it goes without saying that the machine costs significantly add to the cost of the finished article. Therefore, any step that may reduce the down-time of the machine is desirable.

The object of the invention thus is, at a reasonable cost, to reduce the down-time of the machine in connection with short production runs by allowing safe tool changing at one working station while the tools remain in operation at the other working stations. According to the invention, this object is achieved in that each working station can be engaged and disengaged independently of the other working stations, that the worktable of the machine is provided throughout its entire length with vertical walls laterally limiting the path of travel of the workpieces, that cover means are manually or automatically connectible to the walls, at least at the working stations, in order there to form a tunnel portion when the working station is out of operation, that each working operation is carried out in a special compartment which is separated from adjacent compartments by means of partitions on either side of the working station, that the compartments each have one door in the external wall, and that means are provided for indicating the state of operation of each working station and preventing unintentional activation of the working station which is out of operation, and interrupting the feeding of workpieces through the machine if a cover means is removed from a working station which is out of operation.

The invention will be described in greater detail hereinbelow with reference to the accompanying drawings which show one embodiment of the invention and in which:

FIG. 2 is a horizontal section illustrating the arrangement in FIG. 1; and

FIG. 3 is a sectional view showing the casing from one end.

Figure 1:
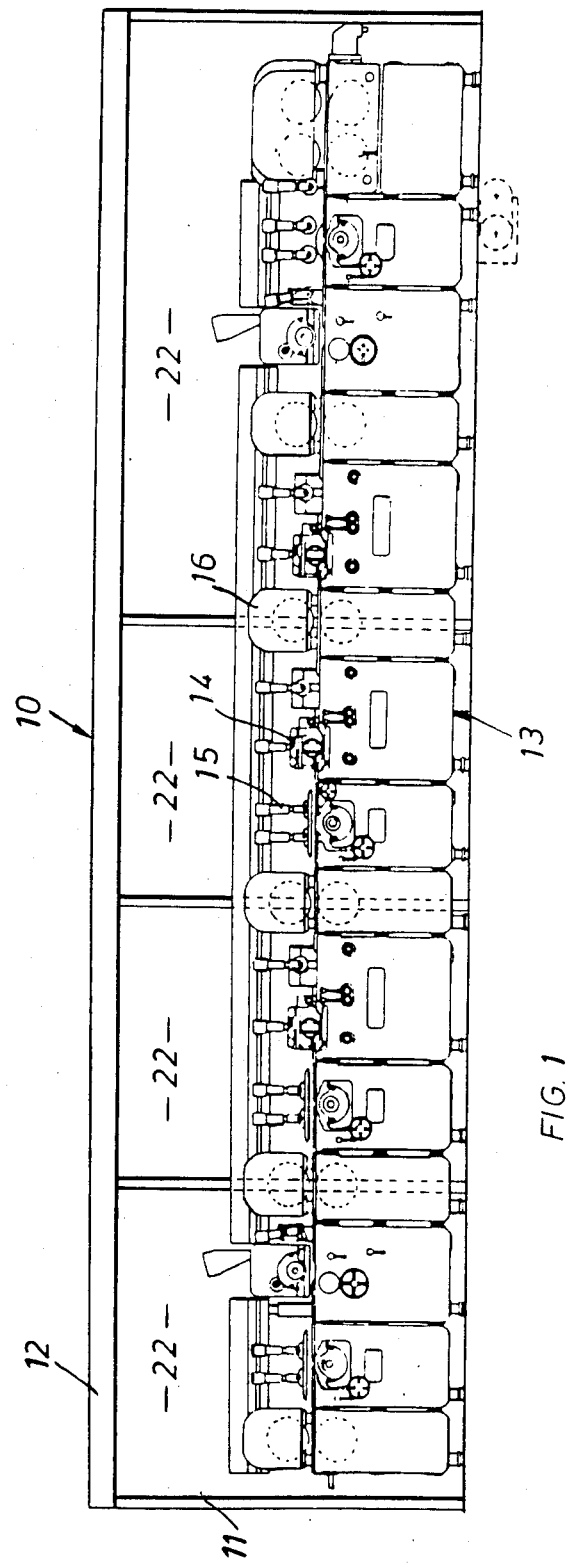
FIG. 1 is a vertical section illustrating a woodworking machine disposed in a casing according to the invention.

As shown in FIG. 1, a woodworking machine 13 is placed in a casing 10 which consists of external walls 11 and a roof 12. The machine 13 is of the type which performs a number of consecutive working operations on workpieces which are fed through the machine by a feeding mechanism 16 and are maintained in engagement against a worktable by means of hold-down means 15. In this manner, it is possible to manufacture e.g. fillets which when fed through the machine are planed and given the desired profile. The machine 13 may have any desired number of working stations 14 with associated hold-down means 15 and feeding mechanisms 16. As appears, each working station has one feeding mechanism 16 on either side.

The machine is of a conventional design with the exception that the number of working stations is increased, such that the required working can be effected with at least one working station out of operation. Preferably, the working stations have been doubled for each working operation.

As appears from FIGS. 1 and 2, the casing 10 is divided into a number of compartments 22 which are defined by partitions 20. In the drawings, there are shown four such compartments 22 of which the central ones are identical while the compartments accomodating the ends of the machine have a slightly different size. The partitions 20 defining the compartments 22 are closely connected to the external walls 11 and the roof 12 of the casing 10 and extend transversely of the machine 13 in association with the feeding mechanism 16 thereof. The partitions 20 are connected as close as possible to the machine 13 over the feeding mechanisms 16. The external walls 11, the roof 12 and the partitions 20 are of the sound-proof type well known to the expert and, hence, the machine will be separated from the surrounding workshop premises and the compartments 22 separated from each other in a sound-proof manner, thus considerably improving the working environment. The compartments 22 communicate with the premises outside the casing by means of doors 21 which are likewise soundproof. As shown in the drawing, each compartment 22 has two doors 21, whereby access is had to both sides of the machine. The doors 21 may be of any suitable type but for better economy of space use is preferably made of sliding doors which are mounted in a well-known manner, as shown in Fig. 3.

The operation of the machine 13 can be controlled from a control panel 17 which can be driven back and forth along a track 18, as shown by a double arrow 19. The track 18 is suspended from brackets 24 (FIG. 3). The tools at the different working stations 14 can be driven independently of each other, i.e. the tools at one or several stations 14 can be stopped while the tools at the other stations 14 continue to operate. The control panel 17, like the casing 10 adjacent the doors 21, may have signalling devices indicating whether the tools in the compartment located behind is in operation or not. Moreover, a safety device is installed which prevents unintentional starting of tools which are out of operation. In some cases, locking means may be provided for the doors which are locked when the working station located inside is in operation. Alternatively, it is conceivable to use doors 21 which when being opened actuate means interrupting the operation of the tools in the compartment 22 located inside the door, or interrupting the feed of the workpieces through the machine.

The object of the arrangement now described is to make it possible for the operator to change tools safely without being harassed by too much noise in the compartment 22 concerned while the operation at other stations continues, to which end the additional or double working stations 14, like the safety devices, have been provided. Since workpieces are fed through the machine during such tool changing, it is important that measures be taken to protect the operator or engine fitter from coming into contact therewith. For this reason, the path of travel of the workpieces along the worktable is limited by protective means in the form of vertical walls one of which may form a guide bar for the workpieces. These walls can be covered, at least at the working stations, by cover means which can be manually or automatically applied and provided with safety means which e.g. interrupt the feeding of workpieces through the machine if a cover means is removed at a working station which is out of operation. Other types of protective means are of course possible, for instance such having a U-shaped cross-section turned upside down. The cover means may of course also be disposed at stations which are in operation. During operation, the operator can thus change tools and mount such tools as are required for the following production run while the processing of workpieces in a first run is still in progress. When the second run starts, one or more of other compartments 22 are disengaged and the tools therein can then be exchanged for such tools as are suitable for a third run.

By the arrangement described above, there are achieved not only an improvement of the working environment and safe tool changing operations but also a considerable reduction of the time required for such changing of tools. In practice, it has been found that the normal time for changing tools, viz. 20–30 minutes, can be reduced to about 3 minutes, which means that the down-time of the machine can be decreased by up to a couple of hours each working day, whereby the relatively simple arrangement according to the invention becomes highly profitable.

I claim:

1. A device for a woodworking machine of the type having plural working stations for performing consecutive working operations on workpieces fed through the machine along a worktable defining a path of travel, said machine having sufficient working stations permitting the required working of the workpieces when at least one working station is out of operation, the working stations being doubled for each working operation, and each working station being engageable and disengageable for operation independently of the other working stations, which device comprises:
   (a) upwardly projecting protective means disposed along the path of travel of the workpieces on the worktable;
   (b) cover means movable into a cooperating position with the protective means for forming a tunnel portion therewith at least at the working stations;
   (c) a soundproof casing enclosing the working stations;
   (d) the soundproof casing including a plurality of individual compartments defined by a plurality of external walls, a plurality of partitions and a roof, each compartment being separated from an adjacent compartment by a partition, and each compartment being provided with a door for permitting access thereto;
   (e) a working station disposed within each compartment for performing a working operation therein;
   (f) means for preventing unintentional activation of a working station that is out of operation; and
   (g) means for interrupting the feeding of workpieces through the machine when the cover means is removed from the cooperating position at a working station which is out of operation.

2. The device of claim 1 wherein the partitions extend between the external walls in a direction disposed transversely to the path of travel of the workpieces along the worktable.

3. The device of claim 1 wherein the machine includes means for guiding the workpieces along the path of travel and the protective means define an integrated part of the guide means.

* * * * *